(12) United States Patent
Yang (10) Patent No.: US 10,483,534 B2
(45) Date of Patent: Nov. 19, 2019

(54) LITHIUM METAL ANODE ELECTRODE

(71) Applicant: Prologium Holding Inc., Grand Cayman (KY)

(72) Inventor: Szu-Nan Yang, New Taipei (TW)

(73) Assignee: PROLOGIUM HOLDING INC., Grand Cayman (KY)

( * ) Notice: Subject to any disclaimer, the term of this patent is extended or adjusted under 35 U.S.C. 154(b) by 238 days.

(21) Appl. No.: 14/797,331

(22) Filed: Jul. 13, 2015

(65) Prior Publication Data
US 2016/0020462 A1    Jan. 21, 2016

(30) Foreign Application Priority Data

Jul. 16, 2014 (TW) .............................. 103124344 A
Jun. 23, 2015 (TW) .............................. 104120087 A (51) Int. Cl.
*H01M 4/38* (2006.01)
*H01M 4/66* (2006.01)
(Continued)

(52) U.S. Cl.
CPC ........... *H01M 4/382* (2013.01); *H01M 4/624* (2013.01); *H01M 4/626* (2013.01); *H01M 4/661* (2013.01);
(Continued)

(58) Field of Classification Search
CPC .... H01M 4/366; H01M 4/134; H01M 4/1395; H01M 4/382; H01M 4/0461;
(Continued)

(56) References Cited

U.S. PATENT DOCUMENTS 6,027,836 A * 2/2000 Okada ................ H01M 2/1653
429/231.8
6,245,464 B1 * 6/2001 Spillman ............... H01M 2/027
429/176
(Continued)

FOREIGN PATENT DOCUMENTS

CA    2820112    *    6/2012    ............. C01D 15/08
CN    1489229 A         4/2004
(Continued)

OTHER PUBLICATIONS

Rama et al. (Journal of Physical Chemistry Solids vol. 57 No. 3 pp. 315-318 1996).*
(Continued)

*Primary Examiner* — Jonathan G Leong
*Assistant Examiner* — Aaron J Greso
(74) *Attorney, Agent, or Firm* — Rabin & Berdo, P.C.

(57) ABSTRACT

A lithium metal anode electrode includes (a) a porous conductive layer including a current collector layer that is porous and has a plurality of first pores, at least parts of the first pores extending through the current collector layer; and a conduction loading layer composed of a porous material that does not alloy with lithium, disposed proximate to the current collector layer, and that having a plurality of second pores, at least parts of the second pores extending through the conduction loading layer; and (b) a lithium metal active material layer composed of lithium metal disposed proximate to the porous conductive layer. Parts of the first and second pores are connected and expose the lithium metal active material layer for electrochemical reactions. The first and second pores have respective surface areas that are adapted for lithium deposition so that a stable SEI layer can be formed thereon.

20 Claims, 6 Drawing Sheets

(51) Int. Cl.
*H01M 10/052* (2010.01)
*H01M 4/62* (2006.01)
*H01M 4/02* (2006.01)

(52) U.S. Cl.
CPC .... *H01M 10/052* (2013.01); *H01M 2004/027* (2013.01)

(58) Field of Classification Search
CPC ........ H01M 4/667; H01M 4/80; H01M 4/463; H01M 4/386; H01M 4/387; H01M 10/049; H01M 10/052
See application file for complete search history.

(56) References Cited

U.S. PATENT DOCUMENTS

| | | | |
|---|---|---|---|
| 8,685,117 B2 | 4/2014 | Tasaki et al. | |
| 2004/0072066 A1* | 4/2004 | Cho | H01M 2/1673 429/137 |
| 2004/0209159 A1* | 10/2004 | Lee | H01M 4/134 429/137 |
| 2005/0191545 A1* | 9/2005 | Bowles | H01M 2/0207 429/127 |
| 2006/0093918 A1* | 5/2006 | Howard | H01M 4/131 429/231.95 |
| 2007/0170051 A1* | 7/2007 | Schlaikjer | G21B 3/00 204/268 |
| 2007/0196735 A1* | 8/2007 | Takeuchi | H01M 4/131 429/231.1 |
| 2008/0166634 A1* | 7/2008 | Kim | H01M 4/131 429/218.1 |
| 2008/0241646 A1* | 10/2008 | Sawa | H01M 10/0431 429/94 |
| 2009/0239053 A1* | 9/2009 | Shindo | G01N 27/4071 428/221 |
| 2013/0202960 A1 | 8/2013 | Kim | |
| 2014/0329120 A1* | 11/2014 | Cui | H01M 10/48 429/90 |
| 2015/0295240 A1 | 10/2015 | Sawai et al. | |

FOREIGN PATENT DOCUMENTS

| | | | |
|---|---|---|---|
| CN | 101341624 | 1/2009 | |
| CN | 101425572 | 5/2009 | |
| CN | 101425572 A | 5/2009 | |
| EP | 1973188 A1 | 9/2008 | |
| EP | 2369658 A1 | 9/2011 | |
| JP | H05-182670 | * 7/1993 | ............ H01M 4/661 |
| JP | H11-283676 | * 10/1999 | ............ H01M 10/40 |
| JP | H11-283676 A | 10/1999 | |
| JP | 2002-190296 | * 7/2002 | ............ H01M 4/02 |
| JP | 2008-192364 | * 8/2008 | ............ H01M 10/05 |
| JP | 2010-182448 A | 8/2010 | |
| KR | 10-2002-0094530 A | 12/2002 | |
| KR | 10-0582558 B1 | 5/2006 | |
| KR | 10-2011-0019101 A | 2/2011 | |
| KR | 10-2013-0067920 A | 6/2013 | |
| KR | 20130116420 A | 10/2013 | |
| KR | 10-2014-0060366 A | 5/2014 | |
| KR | 10-2014-0083181 A | 7/2014 | |
| TW | 201419637 | 5/2014 | |
| WO | WO 2011/077939 | * 6/2011 | ........ H01M 10/0567 |
| WO | 2013/003846 A2 | 1/2013 | |
| WO | 2013/137665 A1 | 9/2013 | |

OTHER PUBLICATIONS

English Machine translation JP 2008-192364 ESPACENET Aug. 21, 2008 printed Feb. 12, 2019.*

* cited by examiner

FIG. 3E

LITHIUM METAL ANODE ELECTRODE

This application claims the benefit of priority based on Taiwan Patent Applications No. 103124344, filed on Jul. 16, 2014 and No. 104120087, filed on Jun. 23, 2015, the contents of which are incorporated herein by reference in their entirety.

BACKGROUND

1. Technical Field

The present invention is related to an anode electrode, in particular to an anode electrode having a conduction loading layer.

2. Description of Related Art

Recently, various portable smart devices are presented to the public. In order to improve the performances of the device, a battery having higher energy density, longer cycle life and safety is required so that the secondary lithium battery becomes one of the most popular solutions for it. However, the safety issue of the secondary lithium battery is unsolved for the serious polarization of the electrodes during charging and discharging. The great amount of the lithium dendrites are formed on the anode electrode rapidly because the ionic conductivity and the electrical conductivity of the battery become non-uniform. By the increasing times of charging and discharging, more and more lithium dendrites are formed and finally penetrate through the separator. Once the lithium dendrites penetrate the separator, the internal shortage of the battery occurs because the cathode and anode electrodes are electrically connected. The internal shortage would result in the great amount of heat generated in a short time and an explosion might come after. This issue becomes much more serious for the large-current battery.

The most common way to solve the problem is to modify the current electrolyte of the battery. For instance, the pure organic electrolyte is exerted for improving the ionic conductivity to overcome the non-uniform ionic conductivity of the electrode. Or, some proper additives can be applied to the liquid-phase electrolyte for forming an oxidation layer, which has good ionic conductivity for the lithium ion, on the surface of the electrode in advance. Via the formation of the oxidation layer, the interface between the electrode and the electrolyte can be more stable and the formation of the lithium dendrite can be constrained. However, the formation of the lithium dendrite might be able to be constrained, but the leakage issue cannot be avoided due to the usage of the liquid-phase electrolyte.

Accordingly, an anode electrode is disclosed in the present invention to overcome the above problems.

SUMMARY OF THE INVENTION

It is an objective of this invention to provide an anode electrode. A larger surface area for the lithium deposition can be implemented via the pores of the anode electrode. Also, a stable SEI (solid-electrolyte interphase) layer is formed as well as the amount of the formation of the lithium dendrite is reduced on the anode electrode so that the efficiency of the reversible reaction is increased.

It is an objective of this invention to provide an anode electrode. The electrical conductivity of the anode electrode can be uniformed via applying a metal film covering the conduction loading layer of the anode electrode so that the amount of the formation of the lithium dendrite is reduced.

It is an objective of this invention to provide an anode electrode. The lithium dendrite is formed close to the lithium metal layer and/or is formed on the lithium metal layer so that the lithium dendrites have no contact with the separator. Hence, it is impossible for the lithium dendrites to penetrate through the separator. Besides, via the lithium dendrite serving as the electrical connection, the electrical connecting surfaces between the porous conductive layer and the lithium metal layer are increased, that is, the electrical resistance between the porous conductive layer and the lithium metal layer is reduced so that the internal resistance of the battery can be reduced.

The present invention discloses an anode electrode comprising a porous conductive layer and a lithium metal layer. The porous conductive layer includes a current collection layer and a conduction loading layer. The conduction loading layer has several first pores. At least some parts of the first pores are through the conduction loading layer. The current collector layer has several second pores. At least some parts of the second pores are through the current collector layer. The lithium metal layer is disposed adjacent to the either current collection layer or the conduction loading layer. The pores of the porous conductive layer provide more surface area of the anode electrode for lithium deposition so that a stable SEI layer can be formed, the amount of the lithium dendrites can be reduced and the efficiency of the reversible reaction can be increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION

The present invention discloses an anode electrode comprising a porous conductive layer and a lithium metal layer. The porous conductive layer includes a current collection layer and a conduction loading layer. The conduction loading layer has several first pores. At least some parts of the first pores are through the conduction loading layer. The current collector layer has several second pores. At least some parts of the second pores are through the current collector layer. The lithium metal layer is disposed adjacent to the either current collection layer or the conduction loading layer.

In the present invention, a larger surface area for lithium depositing can be provided due to the pores of the anode electrode. The structure of the SEI layer formed on the surface of the anode electrode is more stable. Even after several times of the electrical-chemical reactions, there are still some un-reacted surfaces for the lithium to deposit so that the structure of the SEI layer can remain stable. Thus, the amount of the formation of the lithium dendrite is reduced and the reversible-reaction efficiency of the anode electrode is increased. Besides, the lithium dendrites are formed within the area between the porous conductive layer and the lithium metal layer. The internal shortage can be avoided because the lithium dendrites are formed close to the lithium metal layer. Meanwhile, the more electrical connecting surfaces between the porous conductive layer and the lithium metal layer are provided via the lithium dendrites, the less internal resistance between the porous conductive layer and the lithium metal layer is.

Please refer to the FIGS. 1A to 1E, an anode electrode of the present invention is illustrated.

Figure 1A:
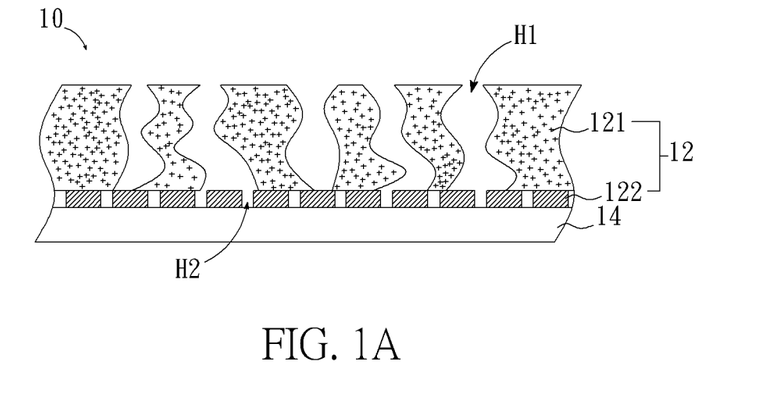
FIG. 1A illustrates the anode electrode of this present invention.

As FIG. 1A illustrated, the anode electrode 10 comprises a porous conductive layer 12 and a lithium metal layer 14. The porous conductive layer 12 comprises a current collector layer 122 and a conduction loading layer 121. In this embodiment, the lithium metal layer 14 is deposited adjacent to the current collector layer 122 of the porous conductive layer 12, that is, the anode electrode 10 comprises the conduction loading layer 121, the current collector layer 122 and the lithium metal layer 14 in order. The current collector layer 122 has several second pores H2 and the conduction loading layer 121 has several first pores H1. At least parts of the second pores H2 and the first pores H1 are in the form of the through holes and, in this embodiment, all the first pores H1 and second pores H2 are through holes. Practically, it is common that only parts of the second pores H2 penetrate through the current collector layer 122 and only parts of the first pores H1 penetrate through the conduction loading layer 121. Although FIG. 1A illustrates the corresponding positions of the pores H2 and H1, the openings of the pores H2 and H1 are not necessary to substantially corresponding to each other, no matter if the pores H2 and H1 are the through holes or not.

Figure 1B:
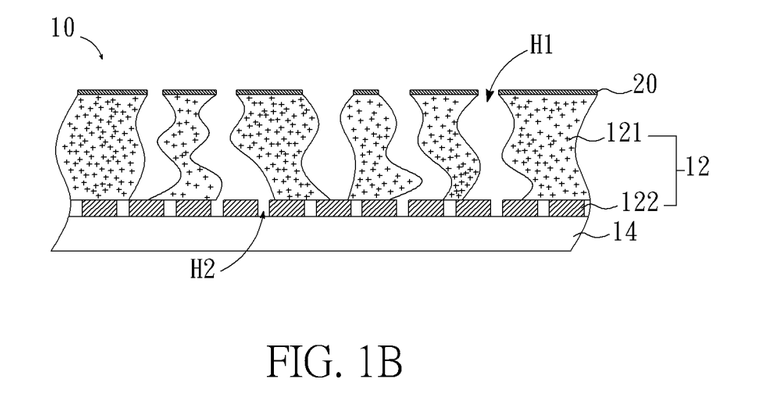
FIG. 1B illustrates the anode electrode further comprising an isolation region of this present invention.
Figure 1C:
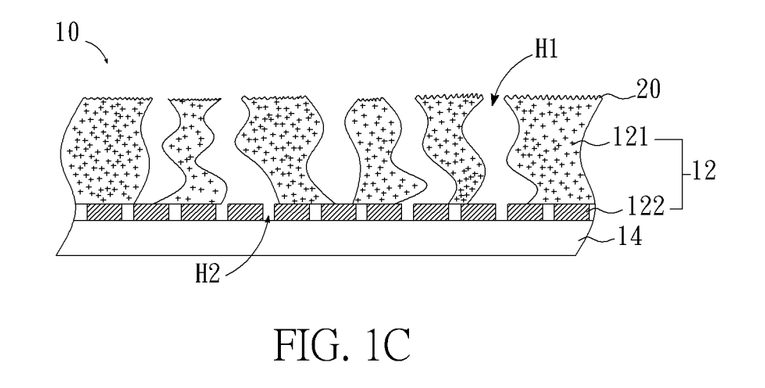
FIG. 1C illustrates the anode electrode further comprising another isolation region of this present invention.
Figure 1D:
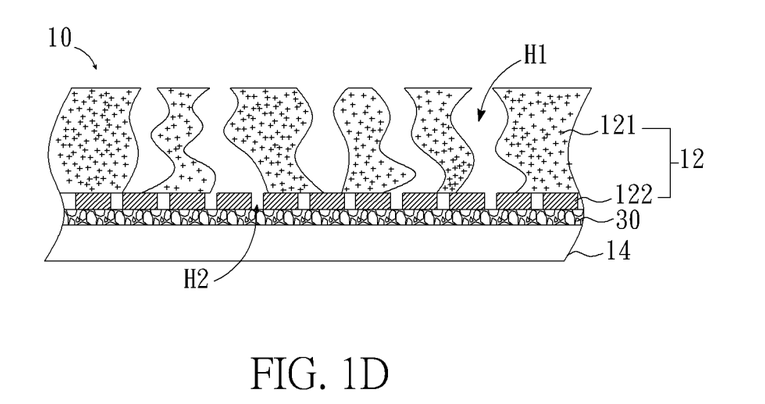
FIG. 1D illustrates the anode electrode further comprising an ionic conducting layer of this present invention.

The anode electrode 10 further comprises at least an isolation region 20, which is deposited on the surface of the porous conductive layer 12 that is away from the lithium metal layer 14, as illustrated in FIGS. 1B and 1C. The isolation region 20 illustrated in FIG. 1B is in the shape of the layer structure. The isolation region 20 illustrated in FIG. 1C is the surface with electrical-isolated treatment for making the isolation region 20 electrically inert. Under the condition of no isolation region 20, before the lithium ions migrate into the pores H1 and H2 of the porous conductive layer 12, the lithium ions are easy to deposit due to the electroplating on the surface of the porous conductive layer 12 that is away from the lithium metal layer 14 as closing to the over-charging state or over-discharging state. Under the condition of existence of the isolation region 20, the lithium ions are not able to be deposited on the surface because the surface has been covered via the isolation region 20. The lithium ions are able to migrate into the porous conductive layer 12 and no more lithium dendrites are formed on the surface of the of the porous conductive layer 12 that is away from the lithium metal layer 14 even as closing to the over-charging state or over-discharging state As FIG. 1D illustrated, the anode electrode of the present invention further comprises an ionic conducting layer 30, which is disposed between the porous conductive layer 12 and the lithium metal layer 14. The ionic conducting layer 30 is in the shape of porous structure, grid structure, rod structure or a combination thereof. Because the ionic conducting layer 30 directly contact with the lithium metal layer 14, the ionic conducting layer 30 must be chemically inert to the lithium. For instance, the ionic conducting layer 30 has no alloy reaction with the lithium metal layer 14. The ionic conducting layer 30 not only has the ionic conductivity, but also has the electrical conductivity via exerting specific materials and/or via the specific reactions such as the lithium deposition reaction to form the lithium dendrites.

Figure 1E:
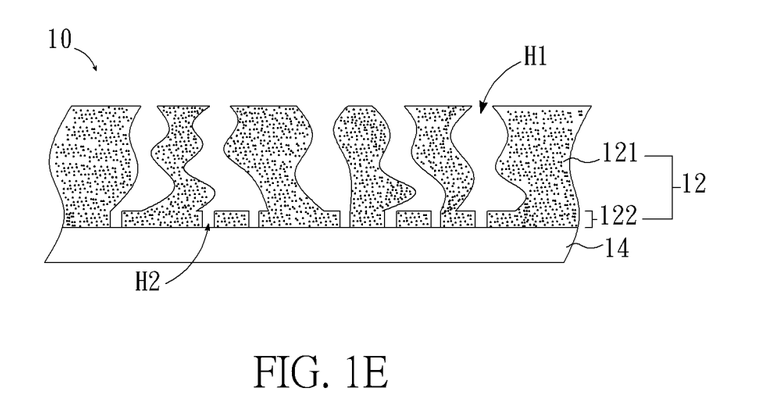
FIG. 1E illustrates the anode electrode of this present invention.

In FIG. 1E, the conduction loading layer 121 and the current collector layer 122 of the porous conductive layer 12 are integrated as a unity. For instance, when the conduction loading layer 121 and the current collector layer 122 are made of the same material, via different process procedures, the second pores H2 and the first pores H1 can be produced for the current collector layer 122 and the conduction loading layer 121 individually, wherein the pores H2 and H1 are not necessary to be in the corresponding position.

Figure 2A:
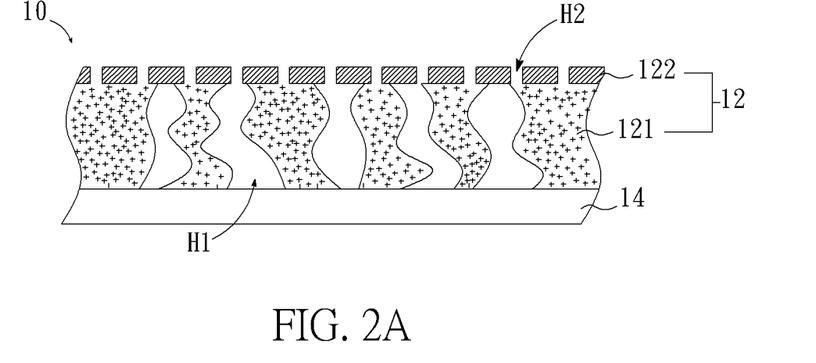
FIG. 2A illustrates the anode electrode of this present invention.

An anode electrode is illustrated in FIG. 2A.

Similar to the abovementioned, the anode electrode 10 comprises the porous conductive layer 12 and the lithium metal layer 14, wherein the porous conductive layer 12 comprises a current collector layer 122 and a conduction loading layer 121. However, the lithium metal layer 14 is deposited adjacent to the conduction loading layer 121 of the porous conductive layer 12, that is, the anode electrode 10 comprises the current collector layer 122, conduction loading layer 121 and the lithium metal layer 14 in order.

Figure 2B:
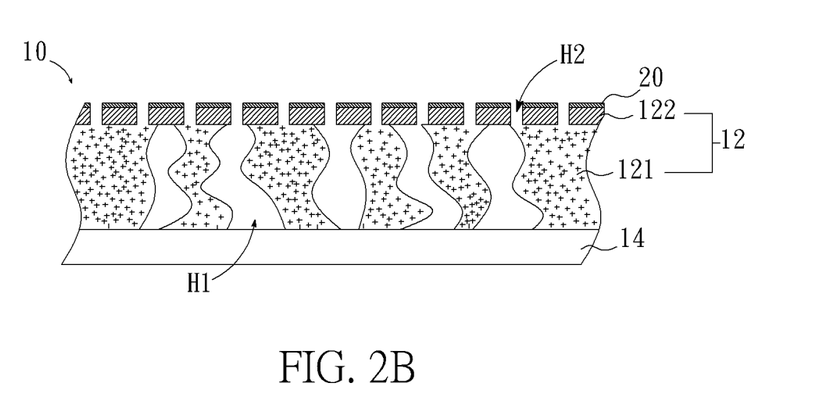
FIG. 2B illustrates the anode electrode further comprising an isolation region of this present invention.
Figure 2C:
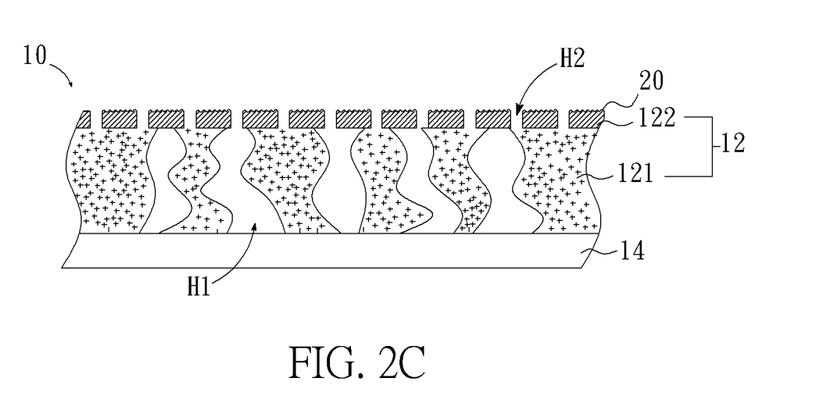
FIG. 2C illustrates the anode electrode further comprising another isolation region of this present invention.
Figure 2D:
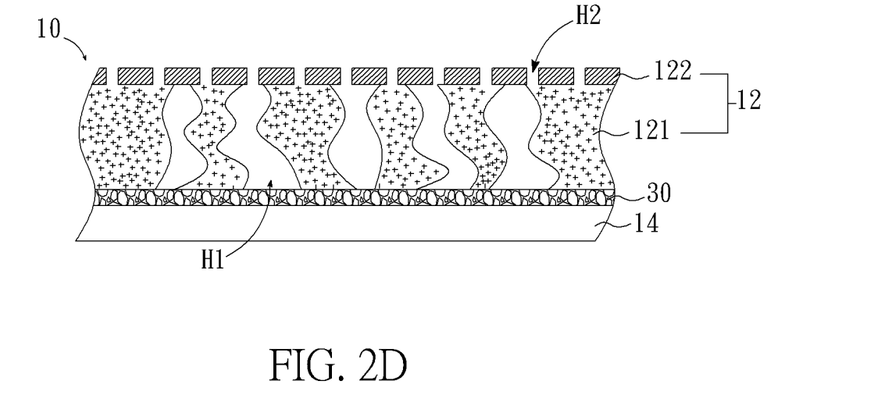
FIG. 2D illustrates the anode electrode further comprising an ionic conducting layer of this present invention.

The isolation region 20 and the ionic conducting layer 30 are respectively illustrated in FIGS. 2B, 2C and 2D, wherein the isolation region 20 can effectively prevent the lithium dendrite to form on the surface, which is away from the lithium metal layer 14, of the conduction loading layer 121 as the conduction loading layer 121 is electrical conductive or is made of conductive materials.

Figure 2E:
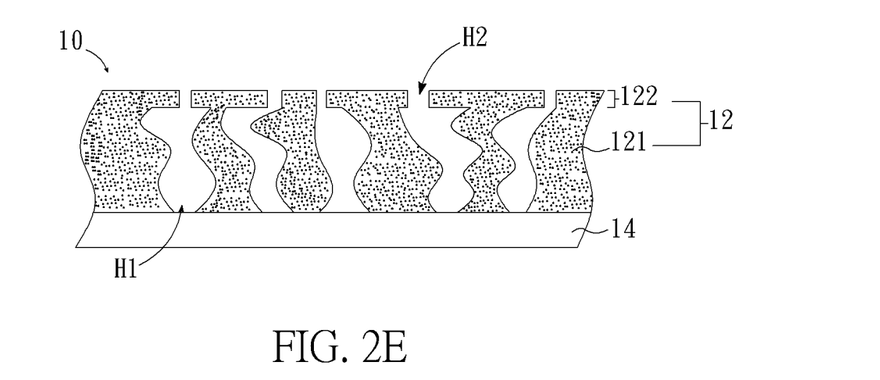
FIG. 2E illustrates the anode electrode of this present invention.

The current collector layer 122 and the conduction loading layer 121 illustrated in FIG. 2E are integrated as a unity. Except for having the same materials, the current collector layer 122 and the conduction loading layer 121 may have exactly the same structure or not. However, what is different from the embodiment in FIG. 1E is the lithium metal layer 14 of this embodiment is deposited adjacent to the conduction loading layer 121 of the porous conductive layer 12.

According to the embodiments above, the surface area of the anode electrode 10 is greatly increased due to the porous conductive layer 12, especially the conduction loading layer 121 of the porous conductive layer 12, so that the structure of the SEI layer formed on the anode electrode 10 can be more stable, the amount of the lithium dendrite can be reduced and the reversible-reaction efficiency can be increased. As the conduction loading layer 121 is made of the metal material, the electrical conductivity of the surface of the conduction loading layer 121 is quite uniform so that there is almost no any deviation of the electrical conductivities around the anode electrode 10. Thus, the amount of the formation of the lithium dendrite can be reduced. Due to the direct contact of current collector layer 122 and the lithium metal layer 14, the material of current collector layer 122 must be selected from the lithium-unalloyable material such as copper, nickel, iron, gold, zinc, silver, titanium or the combination thereof. As the conduction loading layer 121 and the current collector layer 122 are made of the same material, the material of the conduction loading layer 121 is also inert to the lithium. As illustrated, the second pores H2 and the first pores H1 substantially penetrate along the vertical direction through the current collector layer 122 and the conduction loading layer 121 correspondingly. The pores H2 and H1 can be produced via the post processing such as mechanical punching, etching and so on. Or, the pores H2 and H1 can also be produced via exerting the porous material for the current collector layer 122 and the conduction loading layer 121 to form the pores H2 and H1. The pores H2 and H1 are in the shape of through hole, ant hole, blind hole and so on. The lithium metal layer 14 serves as the active material layer of the anode electrode 10. Practically, the conduction loading layer 121 is a porous metal layer such as meshed metal, grid metal, foamed metal and so on. The ionic conducting layer 30 is made of a material selected from the group consisting of a ceramic material, a polymer material, a liquid-phase electrolyte, a solid-phase electrolyte, a gel-type electrolyte, a liquid ion, a conductive material or a combination thereof, and/or the combinations of the materials mentioned above with the pores of the ionic conducting layer 30. The combinations of the materials with the pores of the ionic conducting layer 30 further comprise the implements of forming a thin metal film on the metal/ metalloid/alloyed conductive material via patterned deposition, sputtering and/or electroplating. The conductive material includes the metal material, alloy material, conductive carbon material, such as the graphite, the graphene, the carbon particles, the carbon tube, the metal particles, and so on. The ceramic material includes the metal oxides, the metal sulfides, and the metal nitrides or acidized metal (ex. metal phosphates) and so on.

Figure 3A:
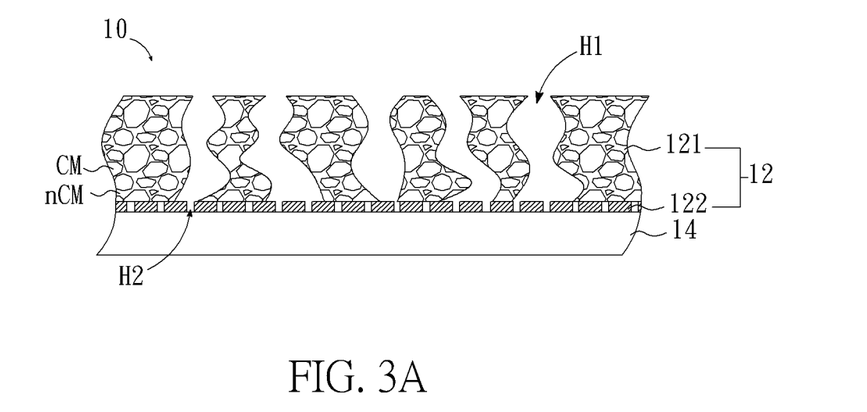
FIG. 3A illustrates the anode electrode of this present invention.
Figure 3B:
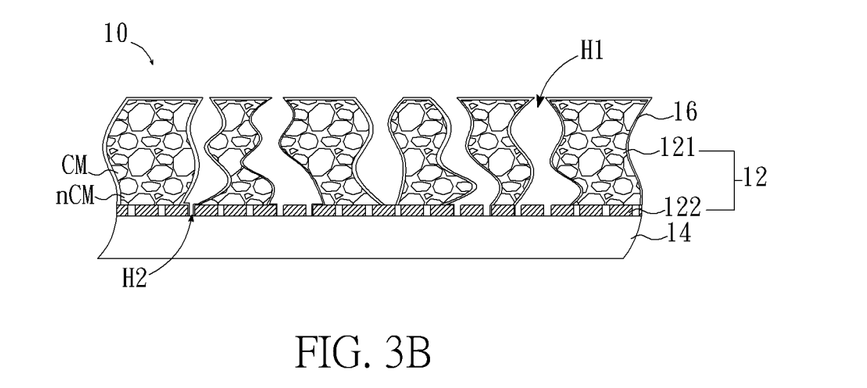
FIG. 3B illustrates the anode electrode further comprising an isolation region of this present invention.

FIGS. 3A and 3B illustrate the anode electrode further comprising an isolation region of this present invention.

The anode electrode 10 illustrated in FIG. 3A comprises a conduction loading layer 121, a current collector layer 122 and a lithium metal layer 14. The current collector layer 122 is deposited between the conduction loading layer 121 and the lithium metal layer 14 and has several second pores H2. The conduction loading layer 121 has several first pores H1. In the present embodiment, the conduction loading layer 121 is made of a conductive film, which has weaker structure. Thus, the current collector layer 122 can also serves as a carrier base to strengthen the structure of the anode electrode 10 besides collecting current. The conduction loading layer 121 comprises at least a conductive material CM and a non-conductive material nCM, wherein the conductive material CM includes the metal material such as metal particles and/or the non-metal material such as graphite, graphene, carbon particles, carbon tube and so on.

Another anode electrode is illustrated in FIG. 3B.

The anode electrode 10 comprises a current collector layer 122 deposited between a conduction loading layer 121 and a lithium metal layer 14. The surfaces of the conduction loading layer 121 and the first pores H1 inside the conduction loading layer 121 are all covered via a metal film 16. The metal film 16 are formed on the surfaces of the conduction loading layer 121 and the first pores H1 via the method such as vapor deposition.

Figure 3C:
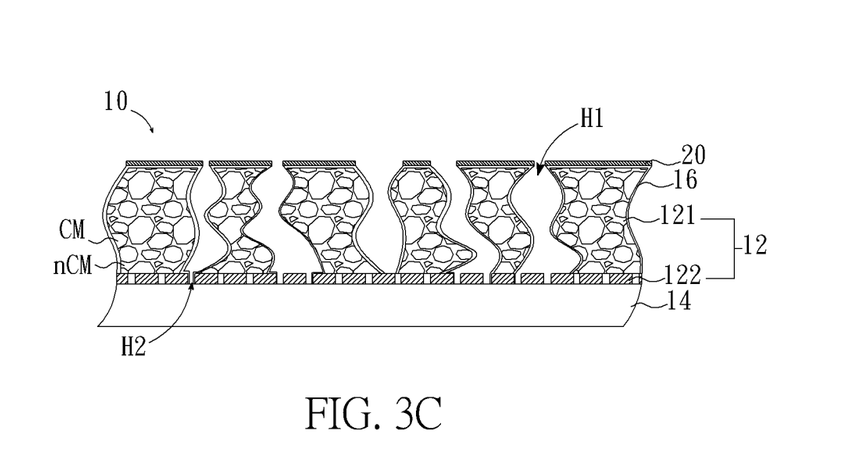
FIG. 3C illustrates the anode electrode further comprising another isolation region of this present invention.
Figure 3D:
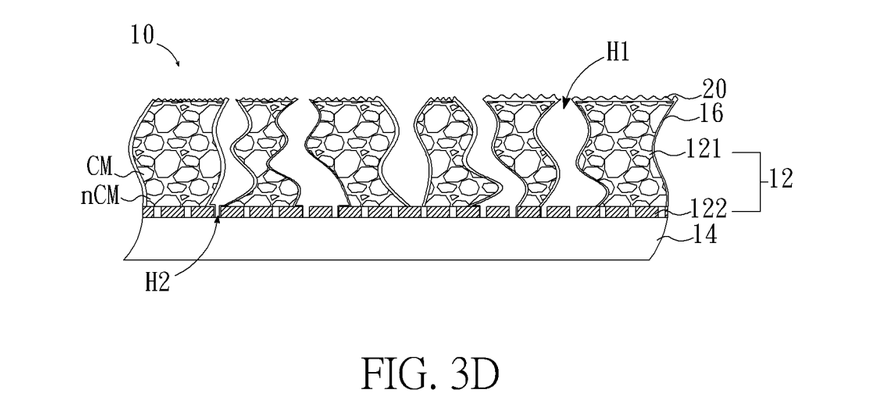
FIG. 3D illustrates the anode electrode further comprising an ionic conducting layer of this present invention.
Figure 3E:
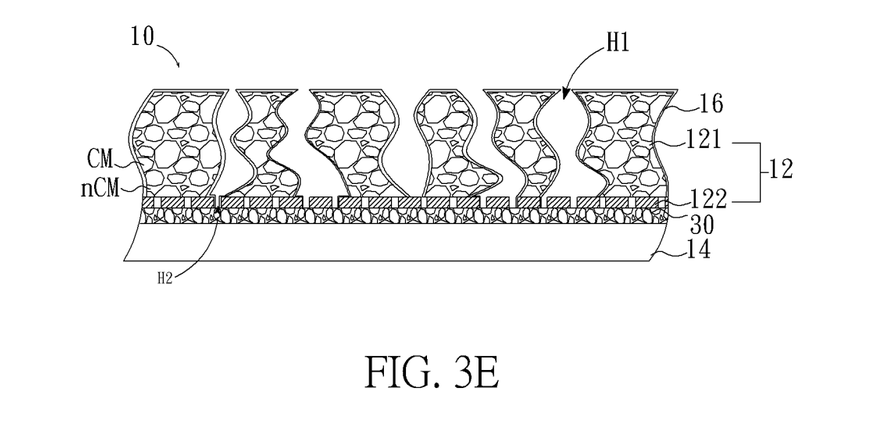
FIG. 3E illustrates the anode electrode of this present invention.

The isolation region 20 and the ionic conducting layer 30 are respectively illustrated in FIGS. 3C, 3D and 3E. The material of current collector layer 122, the conduction loading layer 121 and the metal film 16 are selected from the lithium-unalloyable material such as copper, nickel, iron, gold, zinc, silver, titanium or the combination thereof.

Hence, according the embodiments of the anode electrode above, the porous structure provide larger surface area of the conduction loading layer 121 of the anode electrode 10 so that the more stable SEI layer can be formed, the amount of the lithium dendrites can be reduced and the efficiency of the reversible reaction can be increased. For instance, the surface area of the current collector layer can be increased via the high porosity design. The surface area of the conduction loading layer 121 can be increased via exerting conductive particles having various diameters such as micro-particles and nano-particles. The surfaces of the current collector layer and the conduction loading layer 121 are provided for forming the SEI layer. More precisely, after several times of Faradaic reaction, that is, the electrical-chemical reaction, there are still some un-reacted surfaces for the lithium ions to deposit, in other words, the SEI layers are barely overlapped. The structure of the SEI layer can remain stable due to no structural interference, no ionic conducting interference and no electrical conducting interference so that the SEI layers formed have less structural defects and more uniform electron transfer rate. Thus, the amount of the formation of the lithium dendrite is reduced and the reversible-reaction efficiency of the anode electrode 10 is increased. Comparing to the rough SEI layer, the compact and stable SEI layer has better ionic conductivity and firmed structure. Although few amount of lithium ions are consumed for the Faradaic reaction each time to form the SEI layer on the surface of the conduction loading layer 121, the efficiency of the reversible reaction can still be increased for the compact and stable SEI layer.

Besides the imperfect SEI layer, the existence of the deviations of the electrical conductivities of the surface of the conduction loading layer 121 is another reason for the formation of the lithium dendrite. The area of the surface for forming the lithium dendrites of the anode electrode 10 can be increased via applying the porous conduction loading layer 121. The electrical conductivities of the surface of the conduction loading layer 121 are quite uniform so that the lithium ions are not deposited selectively. As the conduction loading layer 121 is made of material, there exists almost no deviation of the electrical conductivities around the surface of the conduction loading layer 121. As the conduction loading layer 121 is made of the combination of conductive material and non-conductive material (ex. polymer material), the electrical conductivities of the surface corresponding to the conductive material are much higher than the electrical conductivities of the surface corresponding to the conductive material. Thus, the metal film 16 covered on the surface of the conduction loading layer 121 can modify the electrical conductivities around the surface to effectively avoid that the lithium ions selectively deposits on the certain area. However, even if greater amount of the lithium ions are formed and lead to the formation of lithium dendrites, because the lithium metal layer 14 is deposited adjacent to the porous conductive layer 12 (or further includes the ionic conducting layer 30), the lithium ions can only deposit inside the porous conductive layer 12 (and/or the ionic conducting layer 30) so that the lithium dendrites only exist adjacent to the lithium metal layer 14. That is, the lithium dendrites are formed inside the porous conductive layer 12 and/or the ionic conducting layer 30. The two ends of one lithium dendrite contact with the porous conducive layer and the lithium metal layer 14 respectively. The electrical conductivity of the battery system can be improved and the inner resistance can be reduced due to the conductive lithium dendrite. Comparing to the conventional battery system, the lithium dendrites do not cause any damage to the electrode and/or the separator.

The amount of the lithium ion provided via the lithium metal layer 14 must not less than the amount of the lithium ion consumed to form the lithium dendrites. Hence, the thickness of the lithium metal layer 14 has a minimum limitation for providing enough amounts of the lithium ions. Besides, before reaching to the lithium metal layer 14, the lithium ions from the electrolyte for instance could migrate through the first and second pores H1 and H2 which are connected to each other. Under this condition, the potentials of the current collector layer 122, the conduction loading layer 121 are close to the potential of the lithium metal layer 14. However, the distance in vertical between the first and second pores is further; the overvoltage between the current collector layer 122 and the conduction loading layer 121 is getting more obvious. It is because that, based on the potential of the lithium metal layer 14, the potentials of the current collector layer 122 and the conduction loading layer 121 shift more seriously. As the longer ionic migration distance, the deposition rate of the lithium ion varies and the efficiency of deposition/dissolving reaction is reduced. Thus, the vertical distance between the first and second pores has its limitation.

According to the anode electrode disclosed in the present invention, the lithium ions provided via the electrolyte (ex. liquid-phase, solid-phase, gel-type and so on) can form a stable and compact SEI layer on the surface of the anode electrode because the conduction loading layer provides a large surface area for SEI layer formation reaction, a good ionic conductivity and a uniform electrical conductivity. Meanwhile, the surface of the conduction loading layer is modified via the metal material having high electrical conductivity so that the selective deposition of the lithium ions can be reduced. Hence, the safety of the battery system can be greatly improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lithium metal anode electrode, comprising:
   (a) a single active layer that consists of a pore-free layer of non-porous lithium metal; and
   (b) a porous conductive layer that is disposed on the single active layer so that the single active layer is exposed for electrochemical reactions through the porous conductive layer, and that comprises:
      a current collector layer that has a plurality of pores defined therein at least a portion of which extend through the current collector layer; and
      a conduction loading layer electrically connected to the single active layer, the conduction loading layer having a plurality of pores defined therein at least a portion of which extend through the conduction loading layer, that comprises a porous material that does not alloy with lithium, and that is disposed proximate to the current collector layer,
   wherein the porous conductive layer has a surface area effective for lithium deposition in use so that a stable solid-electrolyte interphase (SEI) layer is formed thereon.

2. The lithium metal anode electrode of claim 1, wherein the single active layer is disposed adjacent to the current collector layer of the porous conductive layer.

3. The lithium metal anode electrode of claim 1, wherein the single active layer is disposed adjacent to the conduction loading layer of the porous conductive layer.

4. The lithium metal anode electrode of claim 1, wherein the porous conductive layer has a surface which is distanced from the single active layer and on which is disposed an isolation region which is electrically isolated and which comprises an isolation layer.

5. The lithium metal anode electrode of claim 1, further comprising an ionic conducting layer that is disposed between the single active layer and the porous conductive layer, and that is chemically inert to the lithium metal of the single active layer.

6. The lithium metal anode electrode of claim 5, wherein the ionic conducting layer is electrically conductive.

7. The lithium metal anode electrode of claim 5, wherein the ionic conducting layer is structured to have a porous structure, a grid structure, a mesh structure, a rod structure or a combination thereof.

8. The lithium metal anode electrode of claim 5, wherein the ionic conducting layer comprises a material selected from the group consisting of a ceramic material, a polymeric material, a liquid-phase electrolyte, a solid-phase electrolyte, a gel-type electrolyte, a liquid ion, a conductive material, and a combination thereof.

9. The lithium metal anode electrode of claim 1, wherein the current collector layer comprises at least one material selected from the group consisting of copper, nickel, iron, gold, zinc, silver, titanium, and a material that does not alloy with lithium.

10. The lithium metal anode electrode of claim 1, wherein the current collector layer and the conduction loading layer are integrated.

11. The lithium metal anode electrode of claim 1, wherein the conduction loading layer is a porous metal layer.

12. The lithium metal anode electrode of claim 11, wherein the porous metal layer comprises at least one material selected from the group consisting of copper, nickel, iron, gold, zinc, silver, titanium and a material that does not alloy with lithium.

13. The lithium metal anode electrode of claim 1, wherein the conduction loading layer is a conductive film comprising at least a conductive material.

14. The lithium metal anode electrode of claim 13, wherein the conductive material is at least one conductive material selected from the group consisting of graphite, graphene, carbon particles, carbon tubes, and metal particles.

15. The lithium metal anode electrode of claim 1, wherein the anode electrode further comprises a metal film covering the conduction loading layer.

16. The lithium metal anode electrode of claim 15, wherein the metal film comprises at least one material selected from the group consisting of copper, nickel, iron, gold, zinc, silver, titanium and a material that does not alloy with lithium.

17. The lithium metal anode electrode of claim 8, wherein the ceramic material comprises metal oxides, metal sulfides, metal nitrides, metal phosphates, an acidized metal or a combination thereof.

18. The lithium metal anode electrode of claim 8, wherein the conductive material is at least one conductive material selected from the group consisting of graphite, graphene, carbon particles, carbon tubes, and metal particles.

19. The lithium metal anode electrode of claim 1, wherein the material of the conduction loading layer that does not alloy with lithium is a material that is chemically inert to the lithium metal of the single active layer.

20. A lithium metal anode electrode, comprising:
 (a) a single active layer that consists of a pore-free layer of non-porous lithium metal; and
 (b) a porous conductive layer that is disposed on the single active layer so that the single active layer is exposed for electrochemical reactions through the porous conductive layer, and that comprises:
  (i) a current collector layer that is disposed in contact with the single active layer, that has a plurality of pores defined therein at least some of which extend through the current collector layer; and
  (ii) a conduction loading layer electrically connected to the single active layer, the conduction loading layer having a plurality of pores defined therein at least a portion of which extend through the conduction loading layer, that comprises a porous material that does not alloy with lithium, and that is disposed proximate to the current collector layer,
  (iii) a metal film formed to cover surfaces of the conduction loading layer including surfaces of the plurality of pores defined therein,
 wherein the porous conductive layer has a surface area effective for lithium deposition in use so that a stable solid-electrolyte interphase (SEI) layer is formed thereon.

* * * * *